(12) United States Patent
Tang

(10) Patent No.: US 12,479,246 B2
(45) Date of Patent: Nov. 25, 2025

(54) BALL HEAD TURNABLE TRAILER

(71) Applicant: Ximing Tang, Bazhong (CN)

(72) Inventor: Ximing Tang, Bazhong (CN)

( * ) Notice: Subject to any disclaimer, the term of this patent is extended or adjusted under 35 U.S.C. 154(b) by 468 days.

(21) Appl. No.: 18/110,957

(22) Filed: Feb. 17, 2023

(65) Prior Publication Data
US 2024/0140148 A1 May 2, 2024

(30) Foreign Application Priority Data
Nov. 2, 2022 (CN) .......................... 202211359828.7

(51) Int. Cl.
*B60D 1/07* (2006.01)
*B60D 1/24* (2006.01)
*B60D 1/46* (2006.01)

(52) U.S. Cl.
CPC .............. *B60D 1/07* (2013.01); *B60D 1/249* (2013.01); *B60D 1/46* (2013.01)

(58) Field of Classification Search
CPC ... B60D 1/06; B60D 1/07; B60D 1/46; B60D 1/241; B60D 1/249

USPC ...................................... 280/490.1
See application file for complete search history.

(56) References Cited

U.S. PATENT DOCUMENTS

| 2013/0020784 A1* | 1/2013 | Weipert | B60D 1/54 |
| | | | 280/490.1 |
| 2023/0061552 A1* | 3/2023 | Borkholder | B60D 1/488 |

* cited by examiner

*Primary Examiner* — Valentin Neacsu
*Assistant Examiner* — Felicia L. Brittman-Alabi
(74) *Attorney, Agent, or Firm* — Zhigang Ma

(57) ABSTRACT

A ball head turnable trailer is provided, including a trailer body and a trailer assembly containing a connecting component and a trailer component. The trailer component includes a mounting base and multiple ball heads. A rotating adjustment assembly includes a pin sleeve, a fixed pin, and a reset spring. A rotating shaft is roundly set with multiple fixed holes, each of which is matched with the fixed pin. A pull portion is pulled outwards to drive the fixed pin to move out from the fixed hole to release position limiting between the mounting base and the rotating shaft. The trailer no longer needs remove the fixed pin, which prevents the fixed pin losing. Moreover, the trailer is simple and labor-saving to pull, which is convenient and efficient.

11 Claims, 10 Drawing Sheets

BALL HEAD TURNABLE TRAILER

TECHNICAL FIELD

The disclosure relates to a field of vehicle traction technology, and more particularly to a ball head turnable trailer.

BACKGROUND

At present, trailers are in a frequent use in daily life and in an extensive application. For example, during vehicle driving, there may be a situation where a trailer rescue may be required due to a malfunction. Furthermore, some caravans, motorcycles, speedboats, and other vehicles need to be towed, therefore, in order to facilitate the trailers, a tow hook assembly will be installed on a front end of a tractor, and a rear end of the tractor needs to be installed with a trailer that is compatible with the tractor.

The trailers in the prior art are various, usually including a trailer arm and several trailer ball heads, which are set to meet different use requirements. However, the trailer ball heads of the trailer are often fixed on the trailer arm, which is unable to adjust position and orientation freely, and difficult to use flexibly. Even if there are some trailers, whose ball heads can be changed relatively, adjusting method is relatively cumbersome. It is time-consuming and laborious to remove the whole ball heads or unscrew screws to align, install and connect again.

SUMMARY

An objective of the disclosure is to provide a novel trailer with simple structure and ball heads of the trailer are more labor-saving and convenient for rotation adjustment.

The above objective of the disclosure is achieved as follows.

A novel ball head turnable trailer includes a trailer body and a trailer assembly amounted onto the trailer body. The trailer assembly includes a connecting component and a trailer component. A first end of the connecting component is connected to the trailer body, and a second opposite end of the connecting component is formed with a rotating shaft. The trailer component includes a mounting base and multiple ball heads arranged on the mounting base. The mounting base is arranged around the rotating shaft and rotates around the rotating shaft.

At least one rotating adjustment assembly is movably arranged on the mounting base and the rotating shaft. The rotating adjustment assembly includes a pin sleeve, a fixed pin movably arranged on the pin sleeve and a reset spring arranged between the pin sleeve and the fixed pin. The rotating shaft is roundly provided with multiple fixed holes and each of the multiple fixed holes is matched with the fixed pin. The pin sleeve is arranged on the mounting base. A first end of the fixed pin is arranged in the corresponding fixed hole, and a second opposite end is provided with a pull portion. When the pull portion is pulled outwards to drive the fixed pin to move out of the corresponding fixed hole to release position limiting between the mounting base and the rotating shaft.

In an embodiment of the disclosure, an end of the pin sleeve is set with an opening for the pull portion to penetrate, the pull portion is set with a pull ring, and the pull ring is exposed outside the mounting base.

In an embodiment of the disclosure, the fixed pin is set with a lug boss, the reset spring is sleeved on the fixed pin, a first end of the reset spring is abutted against the lug boss, and a second opposite end of the reset spring is abutted against a bottom of the pin sleeve.

In an embodiment of the disclosure, the pin sleeve is threaded to the mounting base, and an end of the pin sleeve is exposed from an outer surface of the mounting base.

In an embodiment of the disclosure, at least one anti-off assembly is arranged on the trailer component and the rotating shaft. The anti-off assembly includes an anti-off pin penetrated the mounting base. A locating slot is arranged on a middle and circumferential position of the rotating shaft. And at least part of the anti-off pin is set in the locating slot to prevent the trailer component from moving along an axial direction of the rotating shaft.

In an embodiment of the disclosure, the mounting base is set with a rotating hole, through which the trailer component is sleeved on the rotating shaft. The mounting base is also set with at least one anti-off pin mounting chamber corresponding to the at least one anti-off assembly. A contact hole is formed at a position of a sidewall of at least one anti-off pin mounting chamber overlapping with a sidewall of the rotating hole. When the anti-off pin is arranged in the at least one anti-off pin mounting chamber, the anti-off pin passes through the contact hole corresponding to one of the at least one anti-off pin mounting chamber and be clamped in the locating slot.

In an embodiment of the disclosure, the mounting base is rectangular, each of a first side, a second side and a third side of the mounting base is set with one of the multiple ball heads, the multiple ball heads have different sizes, and the at least one rotating adjustment assembly is arranged on a fourth side of the mounting base.

In an embodiment of the disclosure, the trailer body includes a trailer cantilever and an adjusting vertical arm arranged on an end of the trailer cantilever. Multiple adjusting holes is longitudinally set in the adjusting vertical arm. The connecting component is further set with multiple mounting holes matched with the multiple adjusting holes. The connecting component is further set with an adjusting pin, and the connecting component is fixed on the adjusting vertical arm by making the adjusting pin pass through one of the multiple adjusting holes and two of the multiple mounting holes. The adjusting vertical arm is longitudinally set with two sliding grooves, and the multiple adjusting holes is arranged between the two sliding grooves. The connecting component is further set with two articulated shafts, a first end of each of the two articulated shafts is arranged on the connecting component, and a second opposite end of each of the two articulated shafts is set in a corresponding one of the two sliding grooves. The connecting component is further movable downward along the two sliding grooves to a lower end of the adjusting vertical arm facing away from the trailer cantilever, and rotatable around the two articulated shafts to a side of the adjusting vertical arm at which the trailer cantilever is located, when the adjusting pin is pulled out.

In an embodiment of the disclosure, the connecting component includes a U-shaped connecting seat, which includes a bottom plate, a left side plate and a right side plate. The left side plate and the right side plate are formed on two ends of the bottom plate. The mounting holes are correspondingly arranged on the left side plate and the right side plate, and the rotating shaft is formed on an outer surface of the bottom plate. The two sliding grooves are respectively set in two opposite sides of the adjusting vertical arm. The two articulated shafts are respectively set in the left side plate and the right side plate.

In an embodiment of the disclosure, a first end of the trailer cantilever is connected to the adjusting vertical arm, and a second opposite end of the trailer cantilever is set with at least one inserting hole, and the trailer cantilever is provided with at least one inserting pin. The trailer cantilever is fixed on a preset fixed seat of a tractor at a rear end of the tractor, when the at least one inserting pin is inserted into the at least one inserting pin. The trailer cantilever is sleeved with a damping pad, which is located between the at least one inserting hole and the adjusting vertical arm. A jacking screw is set on a side of the damping pad facing towards the adjusting vertical arm. The tightening screw is rotatable to push the damping pad to move towards the at least one inserting hole, to make an end surface of the damping pad abut against the preset fixed seat.

Compared with the related art, the disclosure has at least outstanding and beneficial technical effects as follows.

The disclosure relates to a novel ball head turnable trailer, which includes the trailer body and the trailer assembly installed on the trailer body. The trailer body is used to connect a tractor, the trailer assembly is used to connect a towed vehicle, the trailer assembly includes the connecting component and the trailer component, the first end of the connecting component is connected to the trailer body, and the second opposite end of the connecting component is formed with the rotating shaft. The trailer component includes the mounting base and the ball heads arranged on the mounting base. When towing, the various ball heads can be selected according to different angles in need, multiple ball heads can be used simultaneously, and even the ball heads can be set to different sizes or shapes for selection, to meet the needs of wider use. The mounting base is arranged on the rotating shaft and can rotate around the rotating shaft. The installation of the mounting base increases a contact area between the trailer component and the rotating shaft, and the force is more uniform.

When the trailer is in use, it is usually necessary to put the ball heads in a right direction, that is, the ball heads face upward. At this time, the trailer is connected to the towed vehicle more stably and safely. In order to ensure the structural strength of the ball heads, the ball heads are often fixed on the trailer component, so it is necessary to adjust installation position of the trailer component to change setting angle of the ball heads. Therefore, the at least one rotating adjustment assembly can be movably arranged on the mounting base and the rotating shaft. The rotating adjustment assembly includes the pin sleeve and the fixed pin movably arranged on the pin sleeve. The reset spring is arranged between the pin sleeve and the fixed pin. Each of the fixed holes is arranged on the rotating shaft to match with the fixed pin. The pin sleeve is fixedly arranged on the mounting base. The pin sleeve is used to prevent the fixed pin from separating from the mounting base. The fixed pin is used to connect the mounting base and the rotating shaft to achieve the fixation of the trailer. One end of the fixed pin is used for penetrating the corresponding fixed hole, and the other end is provided with a pull portion.

A principle of the disclosure is that in a fixed state, the fixed pin is supported by the reset spring, and the inner end of the fixed pin is penetrated the corresponding fixed hole to limit the mounting base rotating relative to the rotating shaft. When there is a necessary need for adjusting, only the pull portion needs to be pulled outwards, the reset spring is compressed, and the pull portion drives the fixed pin to move outwards of the fixed hole until the fixed pin disengages, thereby to release the position limiting between the mounting base and the rotating shaft. Meanwhile, the ball heads drive the mounting base to rotate to a proper position, and then release a tension of a drive part, and the fixed pin pushes the drive part into the fixed hole under the action of the reset spring. Compared with the existing adjustment structure that requires the ball heads to be disassembled or the screw to be unscrewed and then aligned for installation, the disclosure does not need the fixed pin to be disassembled, which can prevent the loss of the fixed pin, and the adjustment is simple and labor-saving. Furthermore, the disclosure no longer needs redundant steps of disassembly and assembly, so it is convenient and efficient.

DESCRIPTION OF REFERENCE NUMERALS

Figure 1:
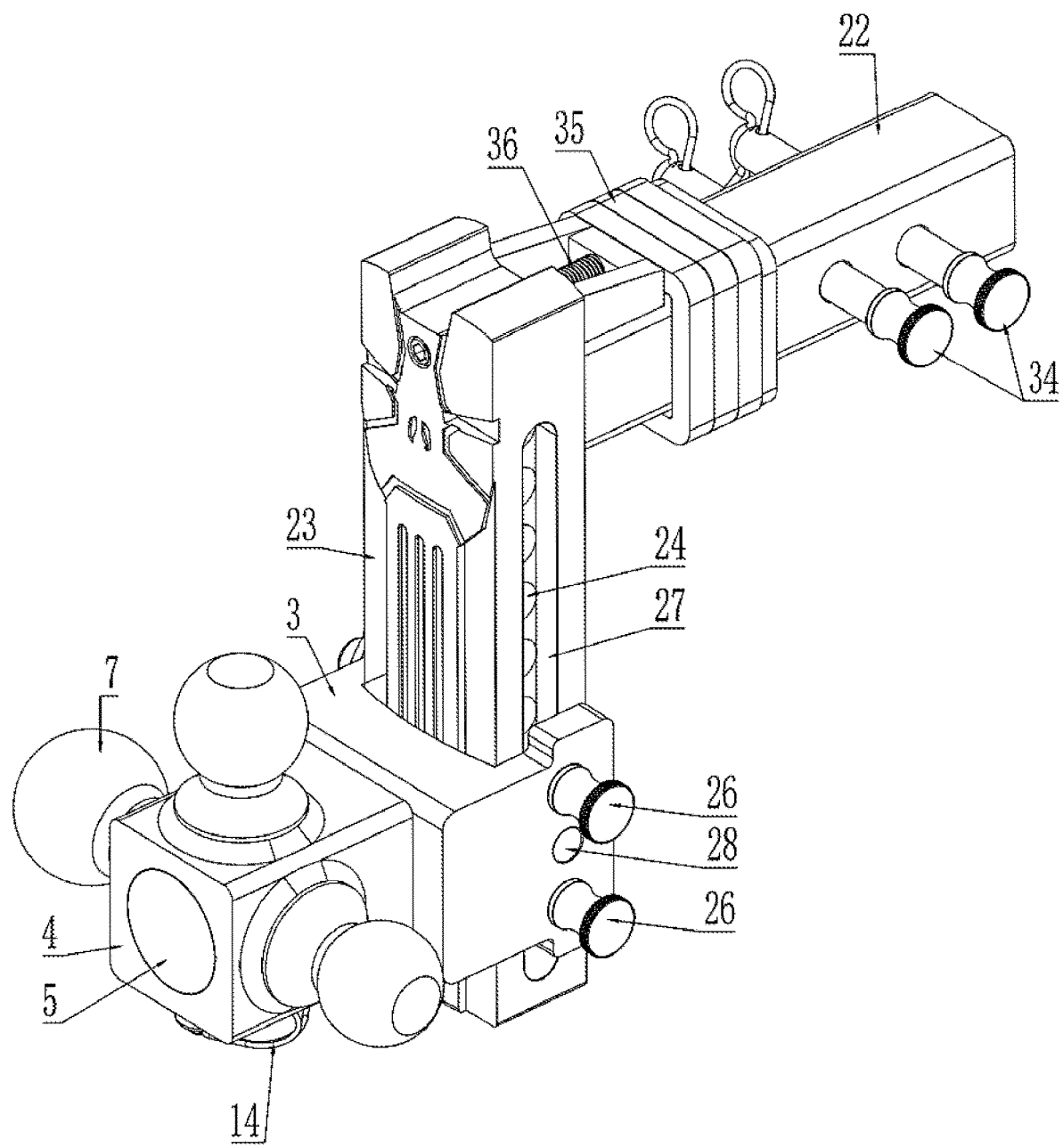
FIG. 1 illustrates a stereogram of a ball head turnable trailer according to an embodiment of the disclosure.
Figure 2:
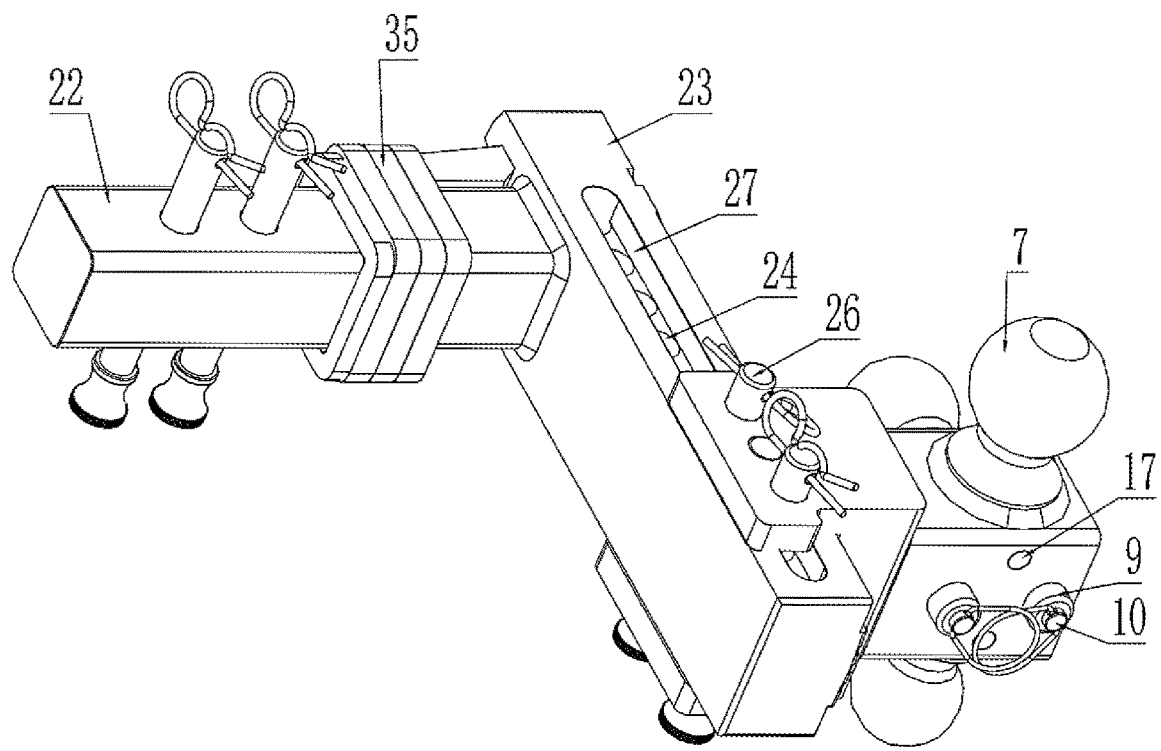
FIG. 2 illustrates another stereogram of the ball head turnable trailer according to an embodiment of the disclosure.
Figure 3:
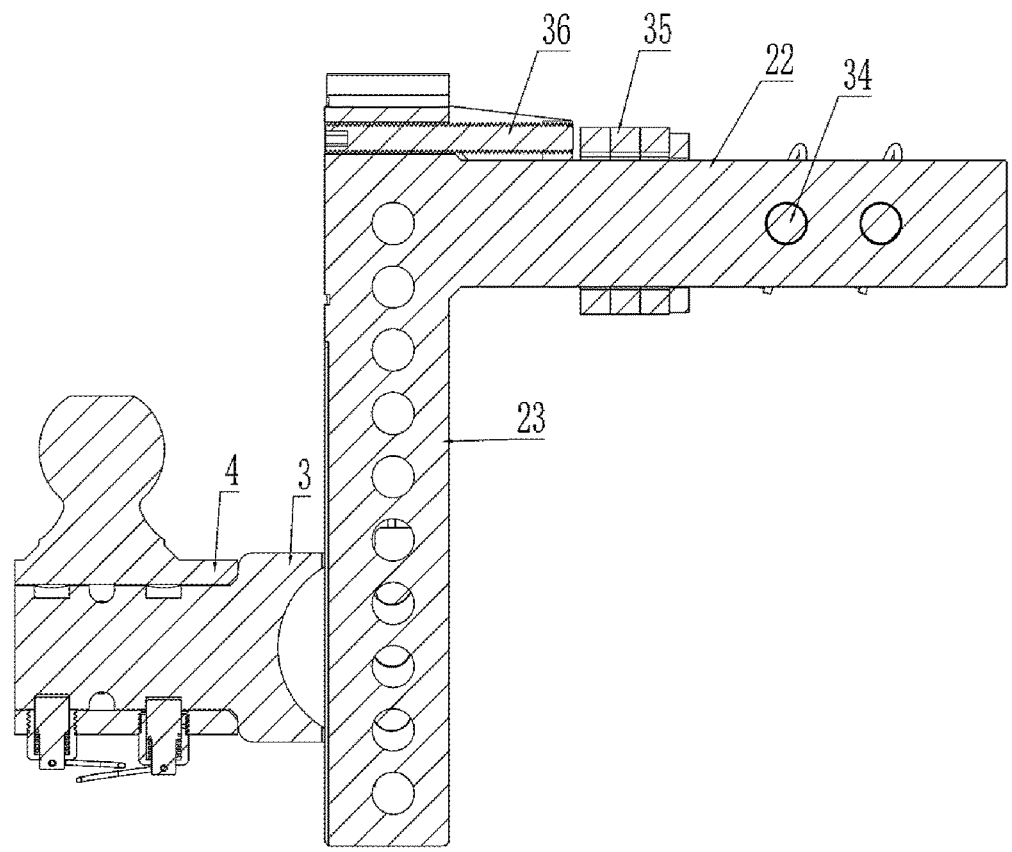
FIG. 3 illustrates a cutaway view of a ball head turnable trailer according to an embodiment of the disclosure.
Figure 4:
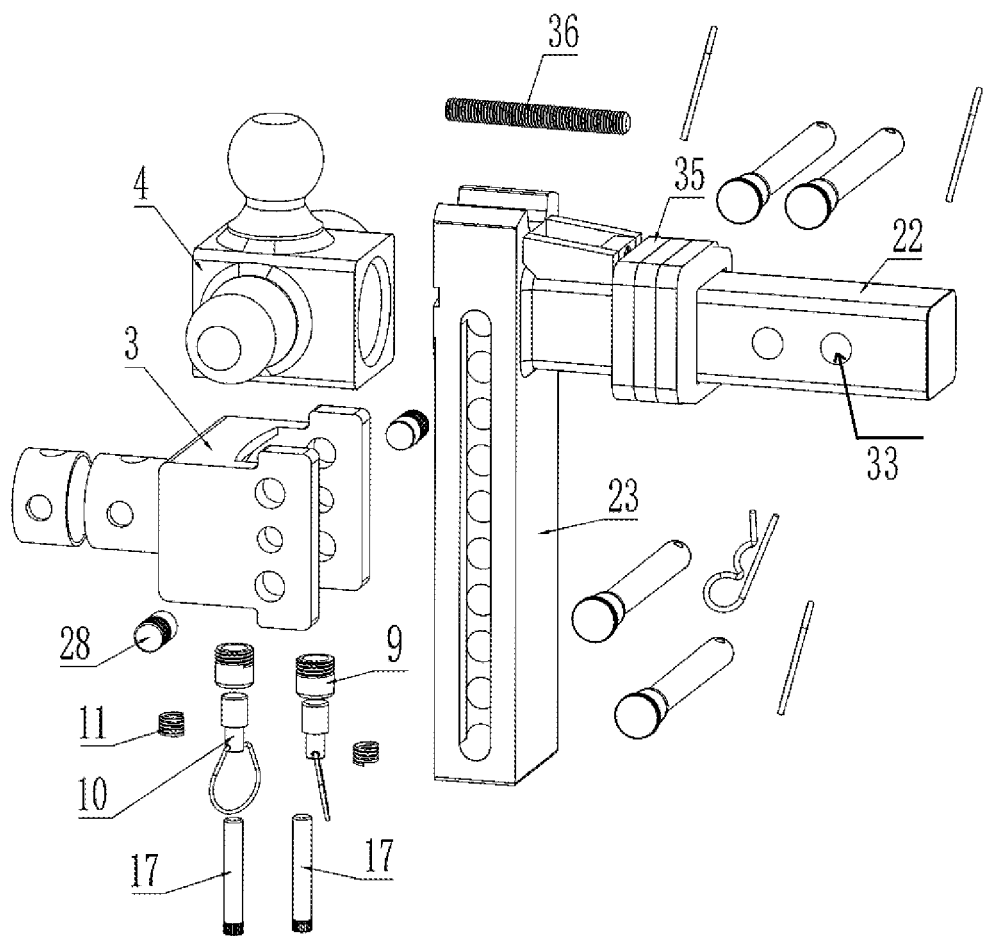
FIG. 4 illustrates an explosive view of a ball head turnable trailer according to an embodiment of the disclosure.
Figure 5:
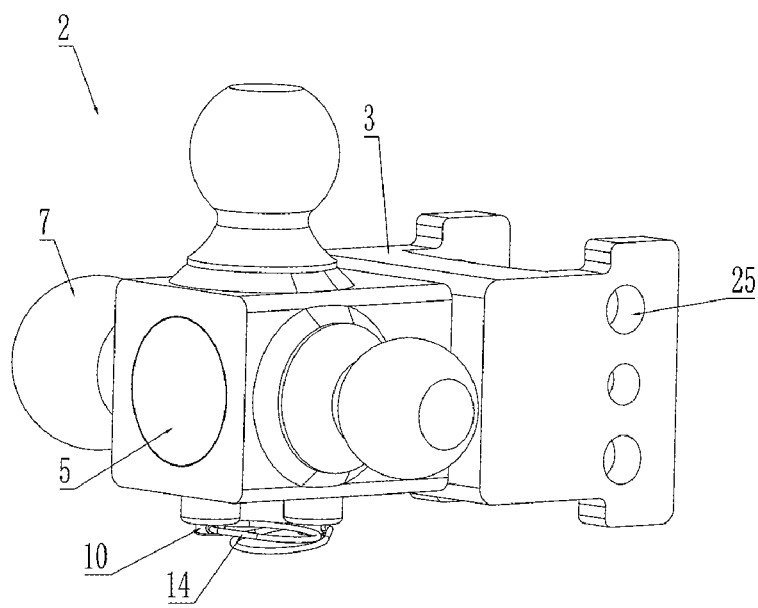
FIG. 5 illustrates a stereogram of a trailer assembly according to an embodiment of the disclosure.
Figure 6:
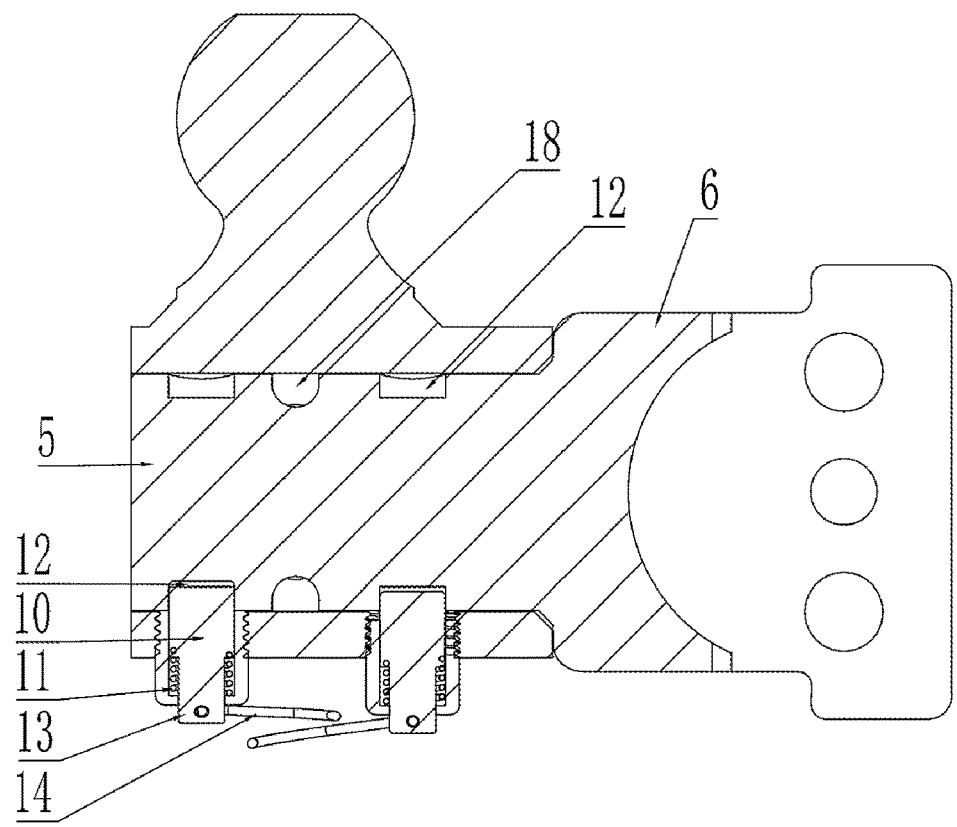
FIG. 6 illustrates a cutaway view of the trailer assembly in FIG. 5.
Figure 7:
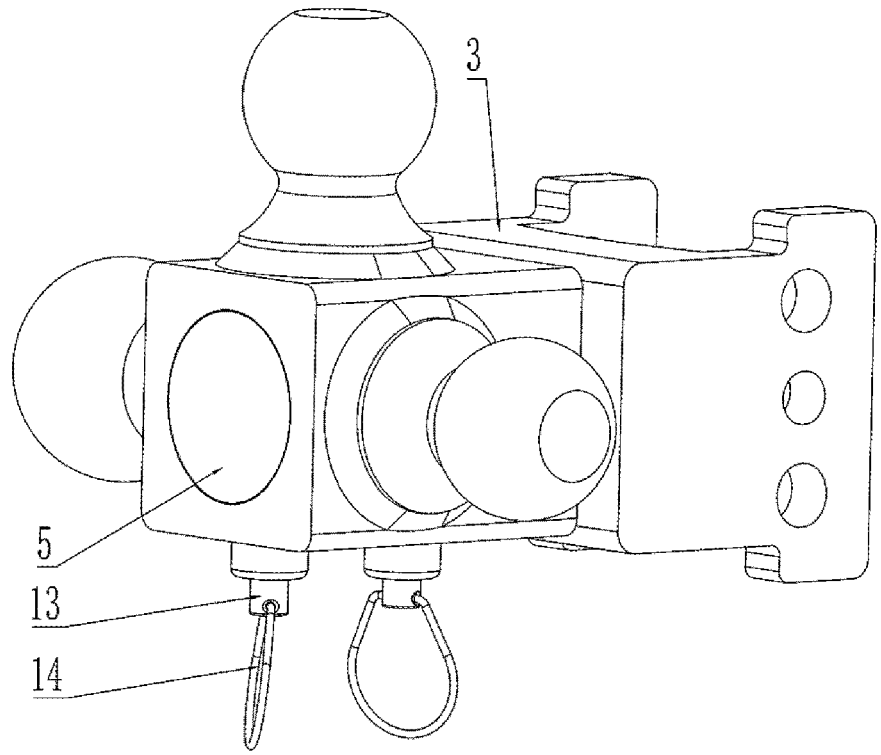
FIG. 7 illustrates a stereogram of the trailer assembly with a fixed pin being not pulled out of a fixed hole according to an embodiment of the disclosure.
Figure 8:
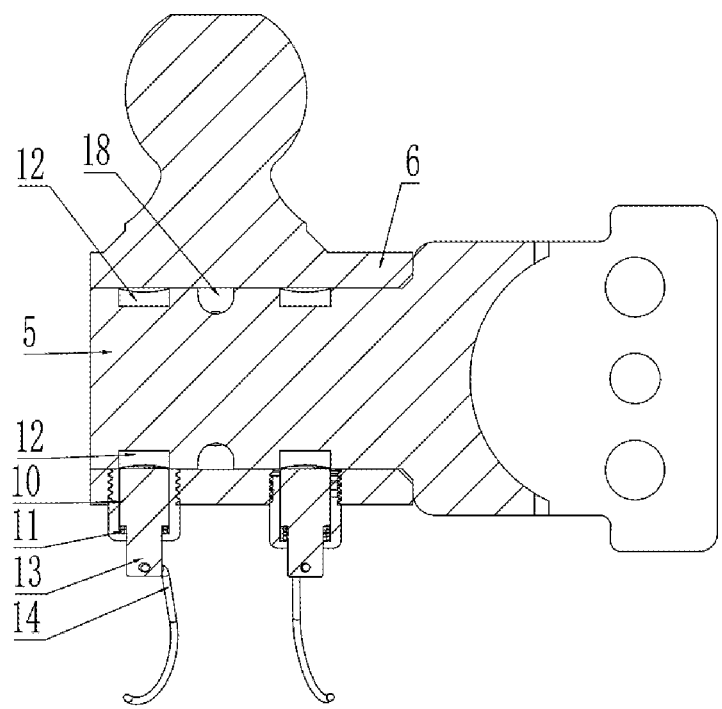
FIG. 8 illustrates a cutaway view of the trailer assembly with the fixed pin pulled out of the fixed hole according to the embodiment of the disclosure.
Figure 9:
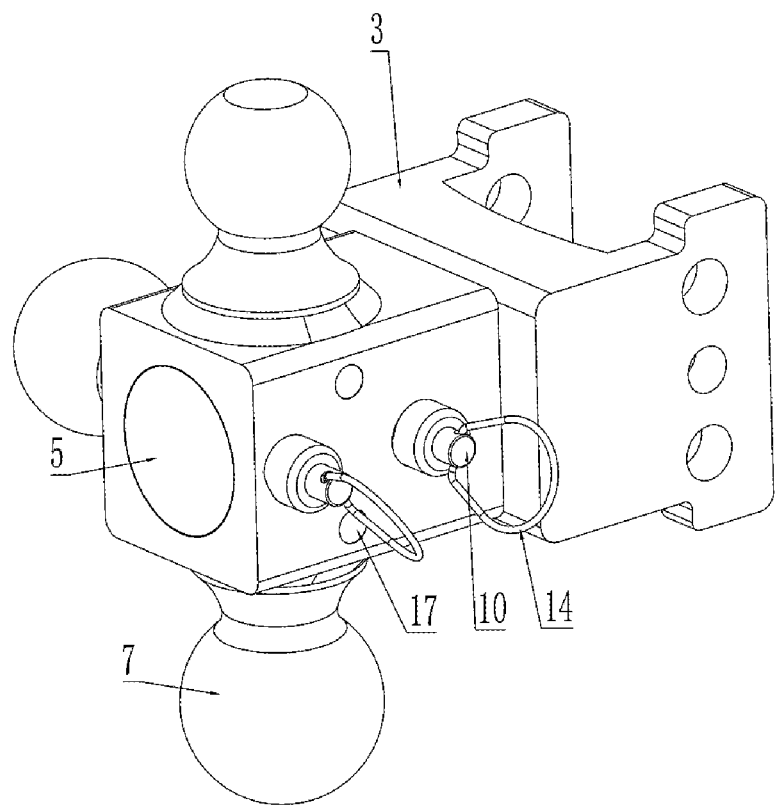
FIG. 9 illustrates a stereogram of the trailer assembly with trailer component rotating around a rotating shaft according to an embodiment of the disclosure.
Figure 10:
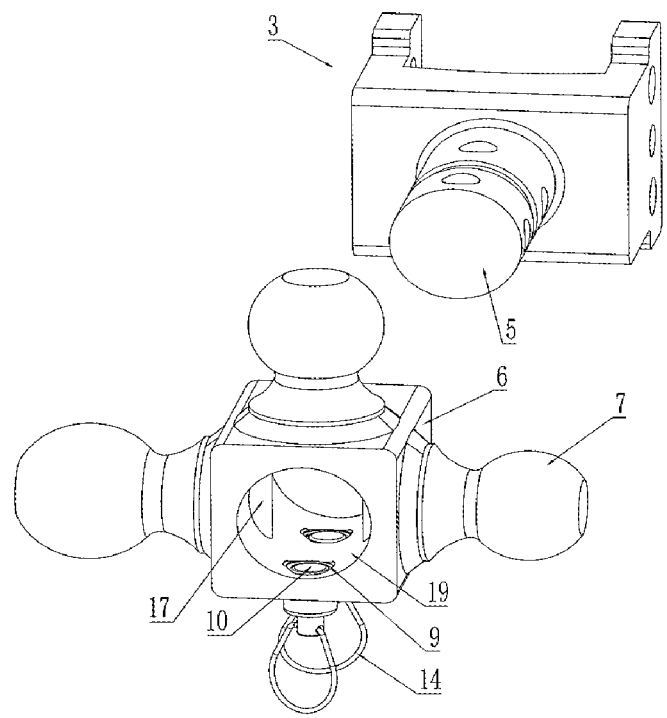
FIG. 10 illustrates an explosive view of the trailer assembly according to the embodiment of the disclosure.
Figure 11:
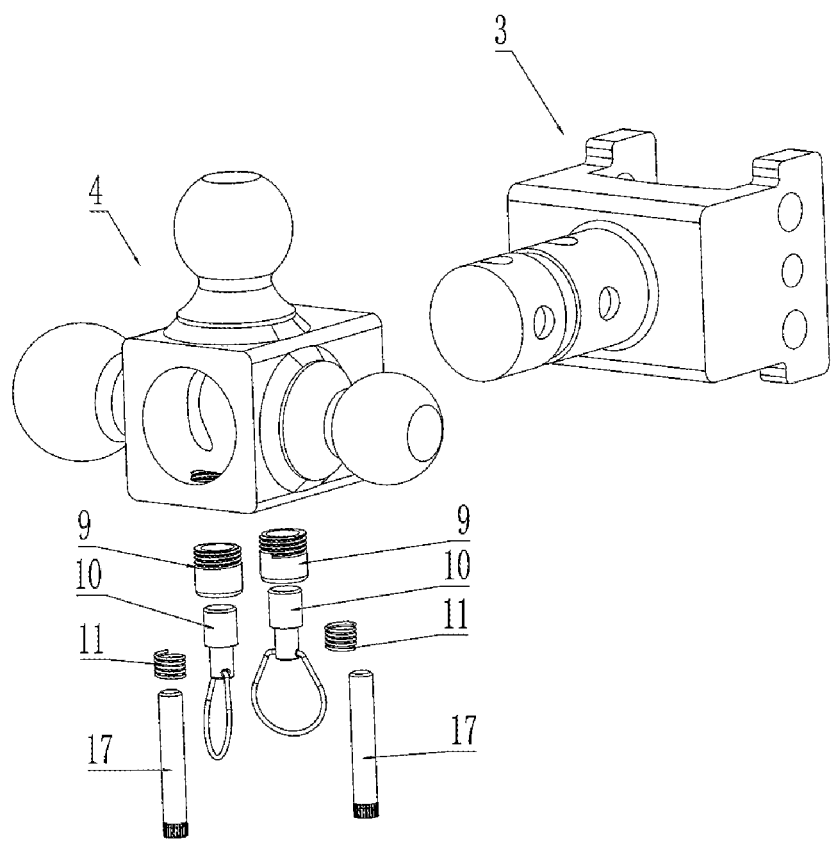
FIG. 11 illustrates another explosive view of the trailer assembly according to the embodiment of the disclosure.
Figure 12:
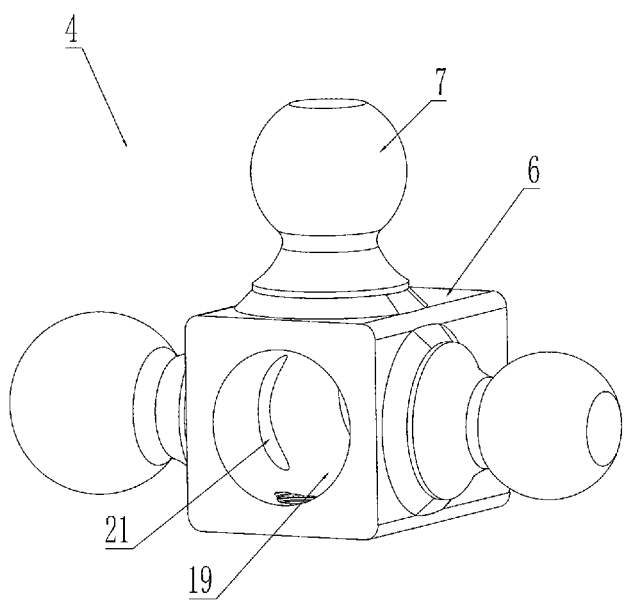
FIG. 12 illustrates a stereogram of a trailer component according to an embodiment of the disclosure.
Figure 13:
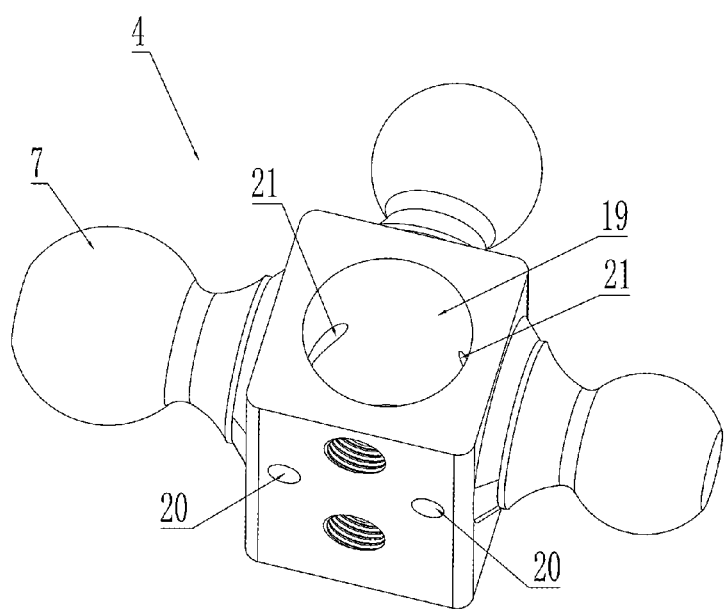
FIG. 13 illustrates another stereogram of the trailer component according to the embodiment of the disclosure.
Figure 14:
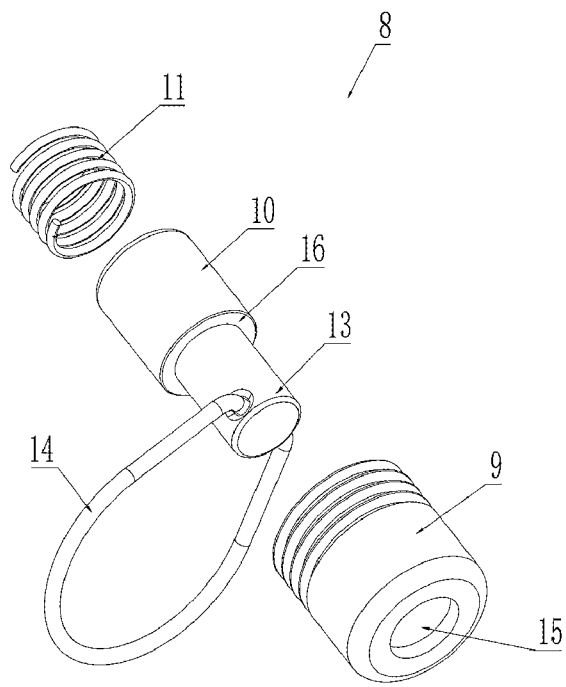
FIG. 14 illustrates an explosive view of a rotating adjustment assembly according to an embodiment of the disclosure.
Figure 15:
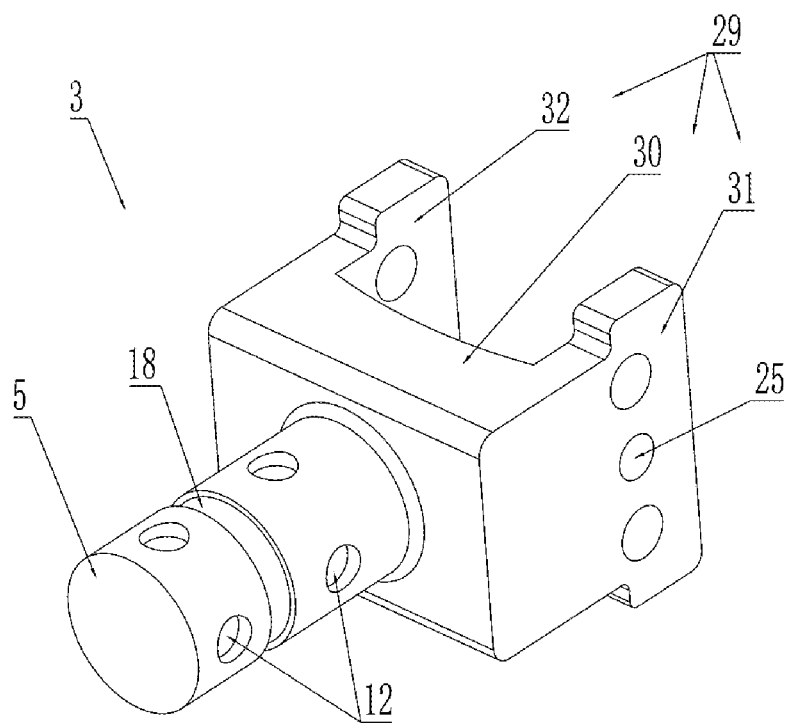
FIG. 15 illustrates a stereogram of a connecting component according to an embodiment of the disclosure.
Figure 16:
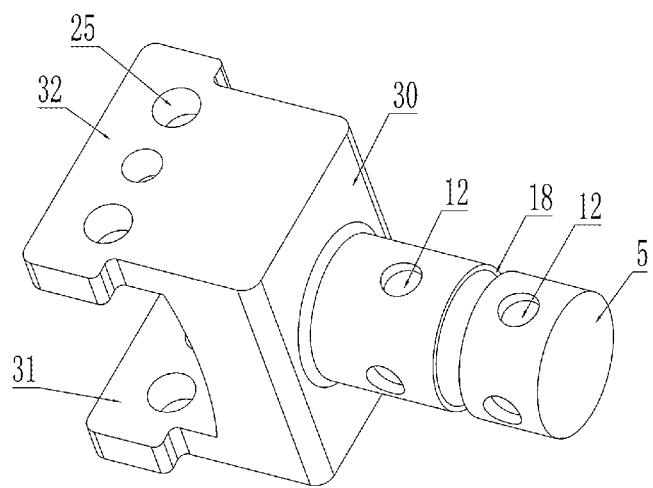
FIG. 16 illustrates another stereogram of the connecting component according to the embodiment of the disclosure.
Figure 17:
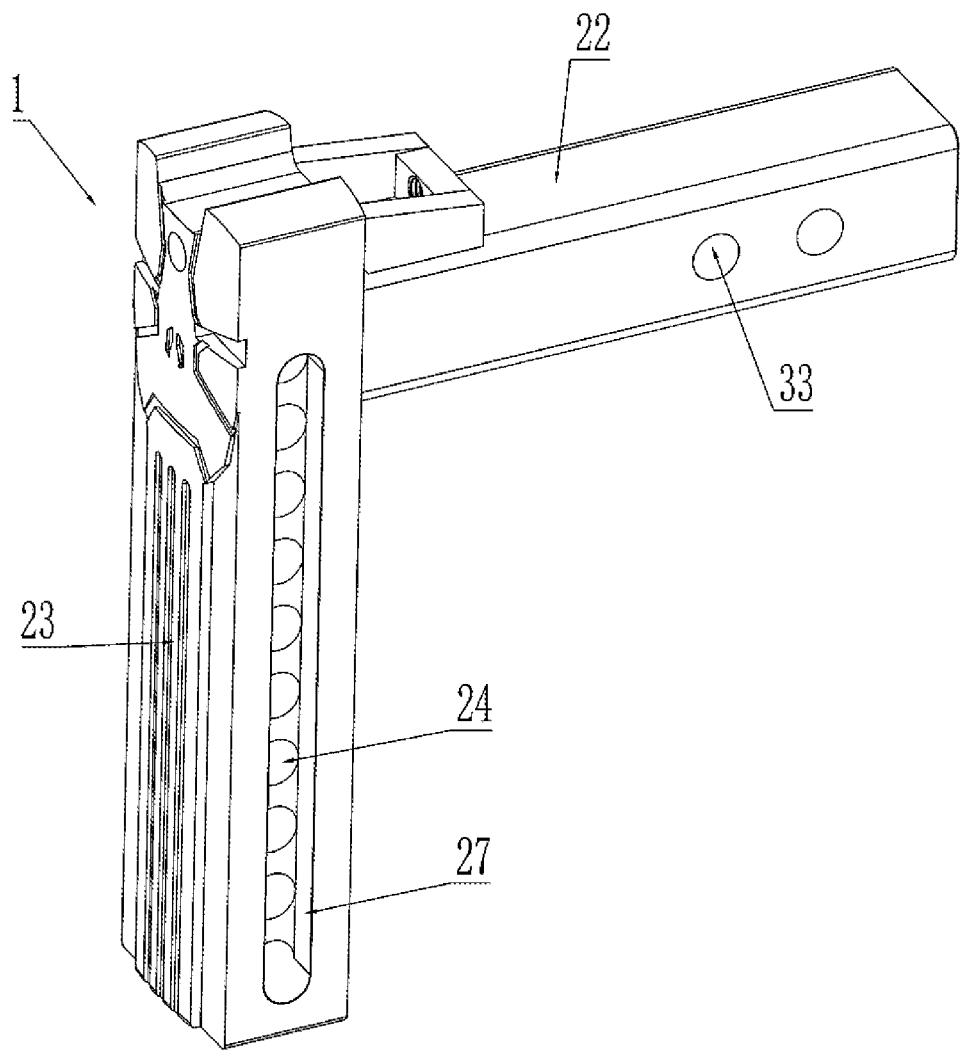
FIG. 17 illustrates a stereogram of a trailer body according to an embodiment of the disclosure.
Figure 18:
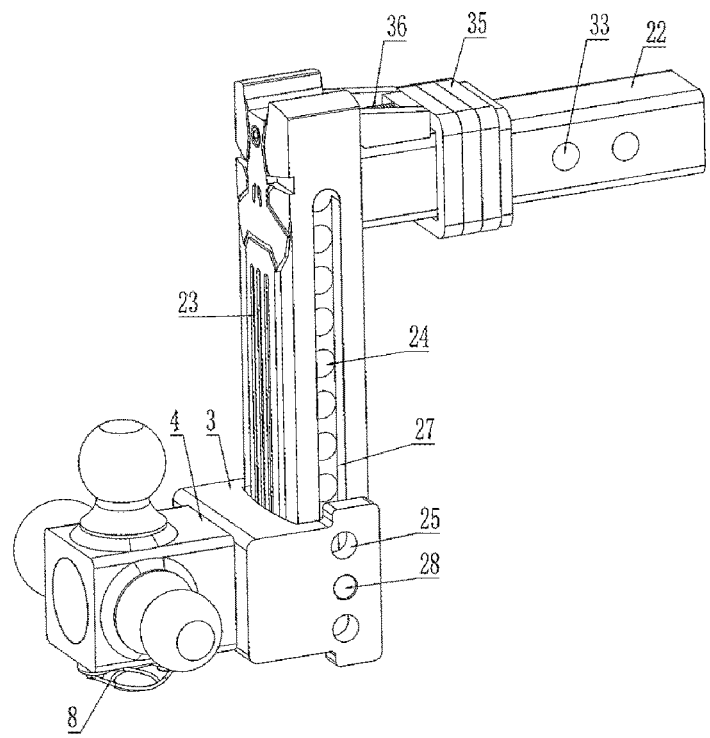
FIG. 18 illustrates a stereogram of the ball head turnable trailer with the trailer assembly sliding to a lower end of an adjusting vertical arm along sliding grooves according to an embodiment of the disclosure.
Figure 19:
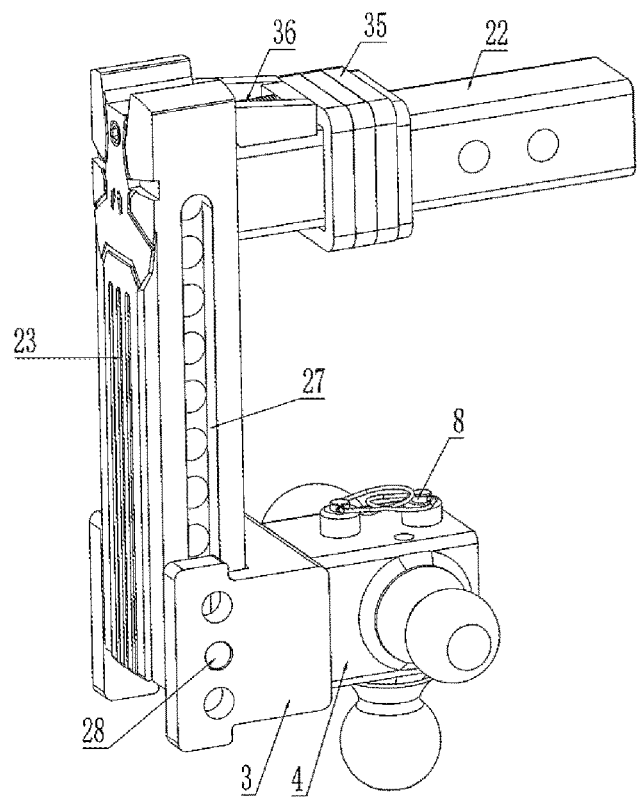
FIG. 19 illustrates a stereogram of the ball head turnable trailer with the trailer assembly rotating to another side of the adjusting vertical arm through articulated shafts according to an embodiment of the disclosure.

1—trailer body; 2—trailer assembly; 3—connecting component; 4—trailer component; 5—rotating shaft; 6—mounting base; 7—ball head; 8—rotating adjustment assembly; 9—pin sleeve; 10—fixed pin; 11—reset spring; 12—fixed hole; 13—pull portion; 14—pull ring; 15—opening;

16—lug boss; 17—anti-off pin; 18—locating slot; 19—rotating hole; 20—anti-off pin mounting chamber; 21—contact hole; 22—trailer cantilever; 23—adjusting vertical arm; 24—adjusting hole; 25—mounting hole; 26—adjusting pin; 27—sliding groove; 28—articulated shaft; 29—U-shaped connecting seat; 30—bottom plate; 31—left side plate; 32—right side plate; 33—inserting hole; 34—inserting pin; 35—damping pad; 36—jacking screw.

DETAILED DESCRIPTION OF EMBODIMENTS

The disclosure is further described below in combination with accompanying drawings.

A novel ball head turnable trailer includes a trailer body 1 and a trailer assembly 2 amounted onto the trailer body 1. The trailer assembly 2 includes a connecting component 3 and a trailer component 4. A first end of the connecting component 3 is connected to the trailer body 1. A second opposite end of the connecting component 3 is formed with a rotating shaft 5. The trailer component 4 includes a mounting base 6 and several ball heads 7 arranged on the mounting base 6. The mounting base 6 is arranged around the rotating shaft 5 and rotates around the rotating shaft 5.

At least one rotating adjustment assembly 8 is movably arranged on the mounting base 6 and the rotating shaft 5. The at least one rotating adjustment assembly 8 include a pin sleeve 9, a fixed pin 10 movably arranged on the pin sleeve 9 and a reset spring 11 arranged between the pin sleeve 9 and the fixed pin 10. Each of multiple fixed holes 12 matching with the fixed pin 10 is roundly arranged on the rotating shaft 5. The pin sleeve 9 is arranged on the mounting base 6. A first end of the fixed pin 10 is arranged in any one of the multiple fixed holes 12, and a second opposite end is set with a pull portion 13. When the pull portion 13 is pulled outwards, the pull portion 13 can drive the fixed pin 10 to move out from the any one of the multiple fixed holes 12, and thereby to release position limiting between the mounting base 6 and the rotating shaft 5.

The disclosure provides a novel ball head turnable trailer, which includes the trailer body 1 and the trailer assembly 2 installed on the trailer body 1. The trailer body 1 is used to connect to a tractor and the trailer assembly 2 is used to connect a towed vehicle. The trailer assembly 2 includes the connecting component 3 and the trailer component 4, a first end of the connecting component 3 is connected to the trailer body 1, and a second opposite end of the connecting component 3 is formed with the rotating shaft 5. The trailer component 4 includes the mounting base 6 and several ball heads 7 arranged on the mounting base 6. When the trailer is used for towing, it is proper to choose the ball heads 7 with different angles, or use multiple ball heads 7 simultaneously or even set the ball heads 7 in different sizes or shapes for selection to meet the needs of wider use. The mounting base 6 is arranged on the rotating shaft 5 and can rotate around the rotating shaft 5. The mounting seat 6 is set to increase contact area between the trailer component 4 and the rotating shaft 5, and the force is distributed more uniformly on the trailer component. When the trailer is in use, it is usually necessary to put the ball heads 7 in a right direction, that is, the ball heads 7 faces upward, which ensures a connection of the towed vehicle is more stable and safer. In order to ensure the structural strength of the ball heads 7, the ball heads 7 are often fixed on the trailer component 4. Therefore, it is necessary to adjust the installation position of the trailer component 4 to change setting angles of the ball heads 7. Therefore, at least a rotating adjustment assembly 8 can be movably arranged on the trailer component 4 and the rotating shaft 5. The rotating adjustment assembly 8 include a pin sleeve 9 and a fixed pin 10 movably arranged on the pin sleeve 9. A reset spring 11 is arranged between the pin sleeve 9 and the fixed pin 10. A corresponding fixed hole 12 matching the fixed pin 10 is arranged around the rotating shaft 5. The pin sleeve 9 is fixedly arranged on the mounting base 6. The pin sleeve 9 is used to prevent the fixed pin 10 from separating from the mounting base 6. The fixed pin 10 is used to connect the mounting base 6 and the rotating shaft 5 to fix the trailer component 4.

The use principle of the disclosure is that when the trailer is fixed, the fixed pin 10 is supported by the reset spring 11, and one end of an inner side of the fixed pin 10 is penetrated the corresponding fixed hole 12 to limit the mounting base 6 rotating relative to the rotating shaft 5. When the trailer needs to be adjusted, only the pull portion 13 needs to be pulled, the reset spring 11 is compressed, the pull portion 13 drives the fixed pin 10 to move outward to the fixed hole 12 until the fixed pin is disengaged, and the limit between the mounting base 6 and the rotating shaft 5 is removed. Meanwhile, the ball heads 7 can drive the mounting base 6 to rotate to a proper position, and then release the tension of a drive part. The fixed pin 10 is pushed into the corresponding fixed hole 12 under the action of the reset spring 11. Compared with that the ball heads 7 are required to be removed or a fixed screw is required to be disassembled and then be aligned and installed again, the disclosure does not need remove the fixed pin 10, which can prevent the loss of the fixed pin 10 and is simple and labor-saving. The disclosure has no redundant steps of disassembly and assembly and is also convenient and efficient.

In an illustrated embodiment of the disclosure, a first end of the pin sleeve 9 is set with an opening 15 for the pull portion 13 to penetrate. The pull portion 13 can extend outward from the opening 15. The pull portion 13 is set with a pull ring 14, which is exposed outside the mounting base 6 for manual holding.

In an illustrated embodiment of the disclosure, a lug boss 16 is formed on the fixed pin 10, and the reset spring 11 is sleeved on the fixed pin 10, with one end against the lug boss 16 and the other end against a bottom of the pin sleeve 9, which is simple for installation. Moreover, the force is distributed on the fixed pin uniformly.

In an illustrated embodiment of the disclosure, the pin sleeve 9 is threaded to the mounting base 6, and an end of the pin sleeve 9 is exposed from an outer surface of the mounting base 6, which is convenient for manual disassembly and assembly without other excessive process.

In an illustrated embodiment of the disclosure, a number of the rotating adjustment assembly 8 is two, which are respectively set along an axial direction to ensure the fixed strength and make the trailer work more safely.

In order to prevent the mounting base 6 from moving along an axial direction of the rotating shaft to reduce a coincidence of the fixed pin 10 and the corresponding fixed hole 12, in an illustrated embodiment of the disclosure, at least one anti-off assembly is arranged on the trailer component 4 and the rotating shaft 5, which includes an anti-off pin 17 arranged on the mounting base 6. A middle and circumferential position of the rotating shaft 5 is formed with a locating slot 18. At least part of the anti-off pin 17 is placed in the locating slot 18 to limit the axial movement of the trailer component 4 along the rotating shaft 5. The anti-off pin 17 and the locating slot 18 can prevent the axial movement of the mounting base 6 by cooperating. The anti-off pin 17 plays a role in locating and further enhances the connection strength between the mounting base 6 and the rotating shaft 5. When the trailer is pulled, the trailer component 4 is not easy to detach from the connecting component 3. At the same time, when the mounting base 6 rotates, the anti-off pin 17 rotates around the locating slot 18, and the anti-off pin 17 plays a role in guiding.

In an illustrated embodiment of the disclosure, the disclosure provides a structure in which the anti-off pin 17 not only can be firmly connected to the mounting base 6, but also be clamped in the locating slot 18. The mounting base 6 is set with a rotating hole 19, and the trailer component 4 is sleeved on the rotating shaft 5 through the rotating hole 19. The mounting base 6 is also set with at least one anti-off pin mounting chamber 20 corresponding to the at least one anti-off assembly. A contact hole 21 is formed at a position of a sidewall of each of the at least one anti-off pin mounting chamber 20 overlapping with a sidewall of the rotating hole 19. When the anti-off pin 17 is arranged in the corresponding anti-off pin mounting chamber 20, the anti-off pin 17 passes through the contact hole 21 and is clamped in the locating slot 18.

In an illustrated embodiment of the disclosure, the mounting base 6 is rectangular, which is convenient for the mounting base 6 to be equipped with the ball heads 7, and for an adjustment and determination of mounting angle of the ball heads 7. Three sides of the rectangular mounting base 6 are respectively provided with one of the ball heads 7. The ball heads 7 have different sizes, for example, the ball heads 7 of large, medium and small sizes are provided, therefore, the user can select the ball heads 7 of appropriate size according to the actual situation of the towed vehicle and rotate the required ball head 7 to a correct orientation, which greatly increases adaptability of the trailer of the disclosure. The at least one rotating adjustment assembly 8 is arranged on a fourth side of the rectangular mounting base 6, the exposed pull ring 14 and other components do not interfere with the use, and a circumference of the rotating shaft 5 is matched with each of the multiple fixed holes 12.

In an illustrated embodiment of the disclosure, the trailer body 1 includes a trailer cantilever 22 that is horizontally arranged and connected to the tractor. An end of the trailer cantilever 22 is longitudinally set with an adjusting vertical arm 23 for installing the trailer assembly 2. The adjusting vertical arm 23 is longitudinally set with multiple adjusting holes 24. The trailer assembly 2 and the adjusting vertical arm 23 are detachable and connected. The trailer assembly 2 can be installed on the adjusting holes 24 at different heights according to actual needs. To meet the adaptation requirements of different trailer scenarios, the connecting component 3 is set with multiple mounting holes 25 matched with the multiple adjusting holes 24. When it is necessary to assemble and use, the mounting holes 25 on the connecting component 3 are aligned with the adjusting holes 24 on the adjusting vertical arm 23 to a correct installation position, and then an adjusting pin 26 is used to successively penetrate one of the corresponding adjusting holes 24 and two of the corresponding mounting holes 25, so that the trailer assembly 2 is firmly fixed on the adjusting vertical arm 23. In an illustrated embodiment of the disclosure, the number of the adjusting pin can be two or more, which is not limited to the embodiments of the disclosure.

In order to facilitate packaging, transportation, and storage, the adjusting vertical arm 23 is longitudinally formed with two sliding grooves 27, the adjusting holes 24 are arranged between the two sliding grooves 27, the connecting component 3 is set with two articulated shafts 28, a first end of each of the two articulated shafts 28 is arranged on the connecting component 3, and a second opposite end of the each of the two articulated shafts is arranged in a corresponding one of the two sliding grooves 27, but the second opposite end does not stretch into the adjusting holes 24. The principle of use is that the adjustment pin 26 is pulled out, but the connecting component 3 will not be separated from the adjusting vertical arm 23 due to limit of the two articulated shafts 28. The connecting component 3 moves downward along the two sliding grooves 27 to a lower end of the adjusting vertical arm 23 facing away from the trailer cantilever 22. Then the connecting component 3 rotates around the two articulated shafts 28 to a side of the adjusting vertical arm 23, at which the trailer cantilever 22 is located. The adjusting pin 26 is fixed to reduce space occupied, which is better for storage and transportation.

In an illustrated embodiment of the disclosure, the connecting component 3 includes a U-shaped connecting seat 29, including a bottom plate 30. Two ends of the bottom plate 30 are formed with a left side plate 31 and a right side plate 32. The mounting holes 25 are correspondingly arranged on the left side plate 31 and the right side plate 32. The left side plate 31 and the right side plate 32 slide up and down along the adjusting vertical arm 23 to find a suitable height the adjusting holes 24, which is stable in connection and evenly stressed. The rotating shaft 5 is formed on an outer surface of the bottom plate 30, and a shape of the connecting component 3 is Y-shaped. When the mounting base 6 installed on the trailer component 4 is sleeved on the rotating shaft 5, a bottom of the mounting base 6 is against the outer surface of the bottom plate 30. The two sliding grooves 27 are respectively arranged on left and right sides of the adjusting vertical arm 23, and the two articulated shafts 28 are respectively arranged on the left side plate 31 and the right side plate 32, which are symmetrical, so that the rotation of the connecting component 3 is more stable without offset, and the fixation of the connecting component 3 is more stable after turning to an appropriate position.

In an illustrated embodiment of the disclosure, a first end of the trailer cantilever 22 is connected to the adjusting vertical arm 23, and a second opposite end is set with at least one inserting hole 33. However, other embodiments of the disclosure can be set with multiple the inserting holes 33. The trailer cantilever 22 is fixed on a fixed seat preset of a tractor at a rear end of the tractor through at least one inserting pin 34. The trailer cantilever 22 is sleeved with a damping pad 35, which is located between the at least one inserting hole 33 and the adjusting vertical arm 23. A jacking screw 36 is arranged on a side of the damping pad 35 facing towards the adjusting vertical arm 23. And the jacking screw 36 can push the damping pad 35 to move towards the at least one inserting hole 33, so that an end face of the damping pad 35 is against the preset fixed seat at the rear end of the tractor. In order to avoid unstable shaking of the trailer caused by the gap between the hole and shaft, the trailer cantilever 22 is sleeved with the damping pad 35, which is located between the at least one inserting hole 33 and the adjusting vertical arm 23. The jacking screw 36 is arranged on a side of the damping pad 35 facing towards the adjusting vertical arm 23. After the trailer cantilever 22 is installed to the preset fixed seat at the rear end of the tractor through the at least one adjusting pin 34, the jacking screw 36 is rotated to push the damping pad 35 to move towards the side of the at least one inserting hole 33 until the end surface of the damping pad 35 is firmly against the preset fixed seat at the rear end of the tractor. In the disclosure, a gap between the jacking screw 36 and the preset fixed seat is filled by setting the damping pad 35, which greatly reduces an active space for the at least one adjusting pin 34 to penetrate the at least one inserting hole 33, and thereby restricts an axial movement of the trailer cantilever 22 after installation. As such, the trailer body 1 is more stable in shock absorption during use, thereby reducing a noise generated during the operation of the trailer. Further, the disclosure avoids repeated collision caused by installation clearance during use and improves the service life of the trailer. In addition, due to a large mass of the towed vehicle, the short distance between the front and rear vehicles, and the inequality of starting, sudden braking, turning and road surface during driving, inertia and road conditions are bound to exert greater impact on the trailer sandwiched between the front and rear vehicles. The damping pad 35 can absorb and alleviate most of impact force, protect the trailer and make the trailer work safer.

The above embodiments are merely some of the illustrated embodiments of the disclosure, not intended to limit the scope of protection of the disclosure. Therefore, any equivalent changes made according to the structure, shape and principle of the disclosure shall be covered in the scope of protection of the disclosure.

What is claimed is:

1. A ball head turnable trailer, comprising:
a trailer body; and
a trailer assembly amounted onto the trailer body;
wherein the trailer assembly comprises a connecting component and a trailer component; a first end of the connecting component is connected to the trailer body, a second opposite end of the connecting component is provided with a rotating shaft; the trailer component comprises a mounting base and a plurality of ball heads disposed on the mounting base; and the mounting base is disposed around the rotating shaft and is configured to be rotatable around the rotating shaft; and
wherein at least one rotating adjustment assembly is movably disposed on the mounting base and the rotating shaft; each of the at least one rotating adjustment assemblies comprises: a pin sleeve, a fixed pin movably disposed on the pin sleeve, and a reset spring disposed between the pin sleeve and the fixed pin; the rotating shaft is roundly provided with a plurality of fixed holes, each of the plurality of fixed holes is capable of being matched with the fixed pin; the pin sleeve is capable of being disposed on the mounting base, a first end of the fixed pin is capable of being disposed in any one of the plurality of fixed holes, and a second opposite end of the fixed pin is provided with a pull portion; and the pull portion is configured to, in response to the pull portion being pulled outwards, drive the fixed pin to move out from the any one of the plurality of fixed holes; and
wherein the pin sleeve is threaded to the mounting base, and an end of the pin sleeve is exposed from an outer surface of the mounting base.

2. The ball head turnable trailer according to claim 1, wherein an end of the pin sleeve is provided with an opening for the pull portion to penetrate therein, the pull portion is provided with a pull ring, and the pull ring is exposed outside the mounting base.

3. The ball head turnable trailer according to claim 1, wherein the fixed pin is provided with a lug boss, the reset spring is sleeved on the fixed pin, a first end of the reset spring is abutted against the lug boss, and a second opposite end of the reset spring is abutted against a bottom of the pin sleeve.

4. The ball head turnable trailer according to claim 1, wherein at least one anti-off assembly is disposed on the mounting base and the rotating shaft, and each of the at least one anti-off assemblies comprises an anti-off pin capable of penetrating the mounting base; a locating slot is disposed on a middle and circumferential position of the rotating shaft; and at least part of the anti-off pin is disposed in the locating slot to prevent the trailer component from moving along an axial direction of the rotating shaft.

5. The ball head turnable trailer according to claim 4, wherein the mounting base is provided with a rotating hole, through which the trailer component is sleeved on the rotating shaft; the mounting base is further provided with at least one anti-off pin mounting chamber corresponding to the at least one anti-off assembly; a contact hole is formed at a position of a sidewall of each of the at least one anti-off pin mounting chambers overlapping with a sidewall of the rotating hole; and the anti-off pin is configured to pass through the contact hole corresponding to one of the at least one anti-off pin mounting chambers and be clamped in the locating slot, when the anti-off pin is disposed in the one of the at least one anti-off pin mounting chambers.

6. The ball head turnable trailer according to claim 1, wherein a shape of the mounting base is rectangular, each of a first side, a second side and a third side of the mounting base is provided with one of the plurality of ball heads, the plurality of ball heads have different sizes, and the at least one rotating adjustment assembly is disposed on a fourth side of the mounting base.

7. The ball head turnable trailer according to claim 1, wherein the trailer body comprises a trailer cantilever and an adjusting vertical arm disposed on an end of the trailer cantilever; a plurality of adjusting holes is longitudinally disposed in the adjusting vertical arm; the connecting component is further provided with a plurality of mounting holes capable of being matched with the plurality of adjusting holes; the connecting component is further provided with an adjusting pin, and the connecting component is configured to be fixed on the adjusting vertical arm by making the adjusting pin pass through one of the plurality of adjusting holes and two of the plurality of mounting holes; the adjusting vertical arm is longitudinally provided with two sliding grooves, the plurality of adjusting holes is disposed between the two sliding grooves; the connecting component is further provided with two articulated shafts, a first end of each of the two articulated shafts is configured to protrude from the connecting component, and a second opposite end of the each of the two articulated shafts is disposed in a corresponding one of the two sliding grooves; and the connecting component is further configured to be movable downward along the two sliding grooves to a lower end of the adjusting vertical arm facing away from the trailer cantilever, and be rotatable around the two articulated shafts to a side of the adjusting vertical arm, at which the trailer cantilever is located, when the adjusting pin is pulled out.

8. The ball head turnable trailer according to claim 7, wherein the connecting component is provided with a U-shaped connecting seat; the U-shaped connecting seat is provided with a bottom plate, a left side plate and a right side plate disposed on two ends of the bottom plate; the plurality of mounting holes are disposed on the left side plate and the right side plate; the rotating shaft is disposed on an outer surface of the bottom plate; the two sliding grooves are respectively disposed in two opposite sides of the adjusting vertical arm; and the two articulated shafts are respectively provided in the left side plate and the right side plate.

9. The ball head turnable trailer according to claim 7, wherein a first end of the trailer cantilever is connected to the adjusting vertical arm, and a second opposite end of the trailer cantilever is provided with at least one inserting hole; the trailer cantilever is provided with at least one inserting pin; the trailer cantilever is configured to be fixed onto a preset fixed seat of a tractor at a rear end of the tractor, when the at least one inserting pin is inserted into the at least one inserting pin; the trailer cantilever is further provided with a damping pad sleeved on the trailer cantilever, and the damping pad is disposed between the at least one inserting hole and the adjusting vertical arm; a jacking screw is disposed on a side of the damping pad facing towards the adjusting vertical arm; and the jacking screw is configured to be rotatable to push the damping pad to move towards the at least one inserting hole, to make an end surface of the damping pad abut against the preset fixed seat.

10. A ball head turnable trailer, comprising:
a trailer body; and
a trailer assembly amounted onto the trailer body;
wherein the trailer assembly comprises a connecting component and a trailer component; a first end of the connecting component is connected to the trailer body, a second opposite end of the connecting component is provided with a rotating shaft; the trailer component comprises a mounting base and a plurality of ball heads disposed on the mounting base; and the mounting base is disposed around the rotating shaft and is configured to be rotatable around the rotating shaft; and
wherein at least one rotating adjustment assembly is movably disposed on the mounting base and the rotating shaft; each of the at least one rotating adjustment assemblies comprises: a pin sleeve, a fixed pin movably disposed on the pin sleeve, and a reset spring disposed between the pin sleeve and the fixed pin; the rotating shaft is roundly provided with a plurality of fixed holes, each of the plurality of fixed holes is capable of being matched with the fixed pin; the pin sleeve is capable of being disposed on the mounting base, a first end of the fixed pin is capable of being disposed in any one of the plurality of fixed holes, and a second opposite end of the fixed pin is provided with a pull portion; and the pull portion is configured to, in response to the pull portion being pulled outwards, drive the fixed pin to move out from the any one of the plurality of fixed holes; and
wherein at least one anti-off assembly is disposed on the mounting base and the rotating shaft, and each of the at least one anti-off assemblies comprises an anti-off pin capable of penetrating the mounting base; a locating slot is disposed on a middle and circumferential position of the rotating shaft; and at least part of the anti-off pin is disposed in the locating slot to prevent the trailer component from moving along an axial direction of the rotating shaft.

11. A ball head turnable trailer, comprising:
a trailer body; and
a trailer assembly amounted onto the trailer body;
wherein the trailer assembly comprises a connecting component and a trailer component; a first end of the connecting component is connected to the trailer body, a second opposite end of the connecting component is provided with a rotating shaft; the trailer component comprises a mounting base and a plurality of ball heads disposed on the mounting base; and the mounting base is disposed around the rotating shaft and is configured to be rotatable around the rotating shaft; and
wherein at least one rotating adjustment assembly is movably disposed on the mounting base and the rotating shaft; each of the at least one rotating adjustment assemblies comprises: a pin sleeve, a fixed pin movably disposed on the pin sleeve, and a reset spring disposed between the pin sleeve and the fixed pin; the rotating shaft is roundly provided with a plurality of fixed holes, each of the plurality of fixed holes is capable of being matched with the fixed pin; the pin sleeve is capable of being disposed on the mounting base, a first end of the fixed pin is capable of being disposed in any one of the plurality of fixed holes, and a second opposite end of the fixed pin is provided with a pull portion; and the pull portion is configured to, in response to the pull portion being pulled outwards, drive the fixed pin to move out from the any one of the plurality of fixed holes; and
wherein the trailer body comprises a trailer cantilever and an adjusting vertical arm disposed on an end of the trailer cantilever; a plurality of adjusting holes is longitudinally disposed in the adjusting vertical arm; the connecting component is further provided with a plurality of mounting holes capable of being matched with the plurality of adjusting holes; the connecting component is further provided with an adjusting pin, and the connecting component is configured to be fixed on the adjusting vertical arm by making the adjusting pin pass through one of the plurality of adjusting holes and two of the plurality of mounting holes; the adjusting vertical arm is longitudinally provided with two sliding grooves, the plurality of adjusting holes is disposed between the two sliding grooves; the connecting component is further provided with two articulated shafts, a first end of each of the two articulated shafts is configured to protrude from the connecting component, and a second opposite end of the each of the two articulated shafts is disposed in a corresponding one of the two sliding grooves; and the connecting component is further configured to be movable downward along the two sliding grooves to a lower end of the adjusting vertical arm facing away from the trailer cantilever, and be rotatable around the two articulated shafts to a side of the adjusting vertical arm, at which the trailer cantilever is located, when the adjusting pin is pulled out.

* * * * *